United States Patent
Chen et al.

(10) Patent No.: US 11,496,937 B2
(45) Date of Patent: Nov. 8, 2022

(54) METHODS AND RELATED DEVICES FOR HANDLING RANDOM ACCESS PROCEDURE IN BANDWIDTH PART SWITCHING OPERATION

(71) Applicant: FG Innovation IP Company Limited, Tuen Mun (CN)

(72) Inventors: Hung-Chen Chen, Hsinchu (TW); Chie-Ming Chou, Hsinchu (TW); Chia-Hung Wei, Hsinchu (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/198,898

(22) Filed: Nov. 23, 2018

(65) Prior Publication Data

US 2019/0166529 A1  May 30, 2019

Related U.S. Application Data

(60) Provisional application No. 62/590,381, filed on Nov. 24, 2017.

(51) Int. Cl.
*H04W 36/06* (2009.01)
*H04L 5/00* (2006.01)
(Continued)

(52) U.S. Cl.
CPC .......... *H04W 36/06* (2013.01); *H04L 5/0053* (2013.01); *H04L 5/0064* (2013.01);
(Continued)

(58) Field of Classification Search
CPC ... H04L 5/0053; H04L 5/0064; H04L 5/0096; H04W 36/06; H04W 36/38; H04W 74/006; H04W 74/0833
See application file for complete search history.

(56) References Cited

U.S. PATENT DOCUMENTS

2018/0098361 A1*  4/2018  Ji .................... H04W 74/0866
2018/0288746 A1* 10/2018  Zhang ............... H04L 1/0031
(Continued)

FOREIGN PATENT DOCUMENTS

CN    106160976 A      11/2016
WO    2011099618 A      8/2011
WO    WO-2019095222 A1 *  5/2019   ........ H04W 74/0833

OTHER PUBLICATIONS

Jung et al., "Random Access and Mobility Handling", Nov. 19, 2017, Lenovo (Singapore) Pte. Ltd, U.S. Appl. No. 62/588,348, pp. 1-20 (Year: 2017).*

(Continued)

*Primary Examiner* — Shah M Rahman
(74) *Attorney, Agent, or Firm* — ScienBiziP, P.C.

(57) ABSTRACT

A method for handling a Random Access (RA) procedure in the Bandwidth Part (BWP) switching operation includes: receiving, by a User Equipment (UE), Downlink Control Information (DCI) including a BWP switching indication via a Physical Downlink Control Channel (PDCCH) when the UE performs a first RA procedure on a first BWP; and performing, by the UE, at least one of a plurality of procedures in response to the BWP switching indication. The procedures include: stopping the first RA procedure on the first BWP and initiating a second RA procedure on a second BWP indicated by the BWP switching indication; and ignoring the BWP switching indication to continue with the first RA procedure.

8 Claims, 13 Drawing Sheets

(51) Int. Cl.
*H04W 36/38* (2009.01)
*H04W 74/00* (2009.01)
*H04W 74/08* (2009.01)

(52) U.S. Cl.
CPC ........... *H04L 5/0096* (2013.01); *H04W 36/38* (2013.01); *H04W 74/006* (2013.01); *H04W 74/0833* (2013.01)

(56) References Cited

U.S. PATENT DOCUMENTS

| | | | | |
|---|---|---|---|---|
| 2018/0367386 A1* | 12/2018 | Liao | .................. | H04W 48/00 |
| 2019/0044689 A1* | 2/2019 | Yiu | .................. | H04L 5/0091 |
| 2019/0059112 A1* | 2/2019 | Ou | .................. | H04W 74/0833 |
| 2019/0081688 A1* | 3/2019 | Deenoo | .................. | H04B 7/088 |
| 2019/0082425 A1* | 3/2019 | Li | .................. | H04L 5/0055 |
| 2019/0090299 A1* | 3/2019 | Ang | .................. | H04W 36/06 |
| 2019/0098655 A1* | 3/2019 | Shih | .................. | H04B 7/0617 |
| 2019/0103954 A1* | 4/2019 | Lee | .................. | H04L 5/0098 |
| 2019/0132109 A1* | 5/2019 | Zhou | .................. | H04W 76/38 |
| 2019/0132110 A1* | 5/2019 | Zhou | .................. | H04L 5/0094 |
| 2019/0132793 A1* | 5/2019 | Lin | .................. | H04W 52/02 |
| 2019/0132855 A1* | 5/2019 | Lee | .................. | H04W 72/0453 |
| 2019/0132857 A1* | 5/2019 | Babaei | .................. | H04W 72/1273 |
| 2019/0132862 A1* | 5/2019 | Jeon | .................. | H04L 5/0087 |
| 2019/0141742 A1* | 5/2019 | Zhou | .................. | H04W 28/20 |
| 2019/0149308 A1* | 5/2019 | Son | .................. | H04L 27/2666 375/260 |
| 2019/0150172 A1* | 5/2019 | Ang | .................. | H04W 24/10 370/329 |
| 2019/0150200 A1* | 5/2019 | Chen | .................. | H04W 74/0833 370/329 |
| 2019/0159261 A1* | 5/2019 | Jung | .................. | H04W 74/0833 |
| 2019/0289513 A1* | 9/2019 | Jeon | .................. | H04W 52/40 |
| 2019/0364602 A1* | 11/2019 | Yi | .................. | H04W 74/0833 |
| 2020/0288502 A1* | 9/2020 | Lee | .................. | H04W 74/0833 |
| 2020/0337051 A1* | 10/2020 | Chang | .................. | H04W 72/042 |
| 2021/0076445 A1* | 3/2021 | Tsai | .................. | H04W 76/27 |
| 2021/0167930 A1* | 6/2021 | Jeon | .................. | H04L 5/0094 |

OTHER PUBLICATIONS

Babaei et al., "HARQ Buffer Management", Oct. 26, 2017, U.S. Appl. No. 62/577,382, pp. 1-65 (Year: 2017).*

Babaei et al. "Scheduling Request", Oct. 27, 2017, USPTO U.S. Appl. No. 62/577,833, Total Pages: 81 (Year: 2017).*

Lee et al., "Restart Condition of BWP Timer for SPS", Nov. 1, 2017, U.S. Appl. No. 62/580,443, Total Pages: 18 (Year: 2017).*

3GPP, "Final Report of 3GPP TSG RAN WG1 #90bis v1.0.0", 3GPP TSG RAN WG1 Meeting #91, R1-1719301, Reno, USA, Nov. 27-Dec. 1, 2017, Total Pages: 206 (Year: 2017).*

Nokia et al. On wider band aspects of NR 3GPP TSG-RAN WGI Meeting NR#2 R1-1710883 Jun. 30, 2017 (Jun. 30, 2017) pp. 1-4.

LG Electronics Inc., "Summary of E-mail discussion on [99bis#43][NR UP/MAC] Impact of BWP", 3GPP TSG-RAN WG2 Meeting #100, R2-1713879, Nov. 27-Dec. 1, 2017(Retrieved on Nov. 17, 2017), The whole document.

CATT, "Further considerations on the RA procedure", R2-1712856, 3GPP TSG-RAN WG2 Meeting #100, Reno, USA, Nov. 27-Dec. 1, 2017.

ZTE Corporation, "Consideration on the autonomous BWP switch", R2-1712433, 3GPP TSG-RAN WG2 Meeting #100, Reno, USA, Nov. 27-Dec. 1, 2017.

Huawei et al., "Remaining issues for BWP", R2-1712326, 3GPP TSG-RAN2 Meeting #100, Reno, USA, Nov. 27-Dec. 1, 2017.

"3rd Generation Partnership Project; Technical Specification Group Radio Access Network; NR; Medium Access Control (MAC) protocol specification(Release 15)", 3GPP TS 38.321 V1.1.0 (Nov. 2017).

* cited by examiner

METHODS AND RELATED DEVICES FOR HANDLING RANDOM ACCESS PROCEDURE IN BANDWIDTH PART SWITCHING OPERATION

CROSS-REFERENCE TO RELATED APPLICATION(S)

The present application claims the benefit of and priority to a provisional U.S. Patent Application Ser. No. 62/590,381 filed Nov. 24, 2017, entitled "Random Access Procedure in BWP Switch Operation," (hereinafter referred to as "US72373 application"). The disclosure of the US72373 application is hereby incorporated fully by reference into the present application.

FIELD

The present disclosure generally relates to wireless communication, and more particularly, to methods and related devices for handling a Random Access (RA) procedure in the Bandwidth Part (BWP) switching operation.

BACKGROUND

In the next-generation (e.g., fifth generation (5G) New Radio (NR)) wireless network, a concept of BWP is introduced. A BWP is a contiguous set of Physical Resource Blocks (PRBs) on a given carrier. These PRBs may be selected from a contiguous subset of the common resource blocks for a given numerology. With the help of the BWP, a User Equipment (UE) may not need to monitor the whole bandwidth of a wideband carrier (e.g., Absolute Radio-Frequency Channel Number (ARFCN)). As such, the power consumption at the UE side may be reduced.

Furthermore, in NR, the UE may switch from one BWP to another BWP when a particular condition is satisfied. However, such BWP switching operation may be triggered while an RA procedure is performed (or say, the RA procedure is "on-going"). For example, a UE may be requested by the Network (NW) to switch its current BWP to another one during a preamble transmission.

Thus, there is a need in the art for methods and devices for handling the RA procedure in the BWP switching operation.

SUMMARY

The present disclosure is directed to methods and related devices for handling the RA procedure in a BWP switching operation.

In an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive Downlink Control Information (DCI) including a BWP switching indication via a Physical Downlink Control Channel (PDCCH) when performing a first RA procedure on a first BWP; and perform at least one of a plurality of procedures in response to the BWP switching indication. The procedures include: stopping the first RA procedure on the first BWP and initiating a second RA procedure on a second BWP indicated by the BWP switching indication; and ignoring the BWP switching indication to continue with the first RA procedure.

In another aspect of the present disclosure, a method is provided. The method includes: receiving, by a UE, DCI including a BWP switching indication via a PDCCH when the UE performs a first RA procedure on a first BWP; and performing, by the UE, at least one of a plurality of procedures in response to the BWP switching indication. The procedures include: stopping the first RA procedure on the first BWP and initiating a second RA procedure on a second BWP indicated by the BWP switching indication; and ignoring the BWP switching indication to continue with the first RA procedure.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
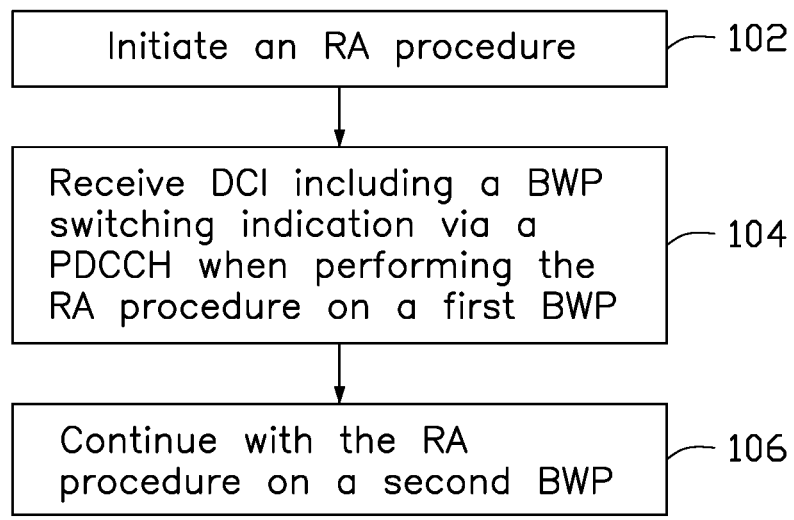
FIG. 1 shows a flowchart for a method of handling an RA procedure in a BWP switching operation, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet) through a radio access network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a personal digital assistant (PDA) with wireless communication capability. The UE is configured to receive/transmit signals over an air interface from/to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the SGC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it should be noted that in a transmission time interval TX of a single NR frame, at least downlink (DL) transmission data, a guard period, and uplink (UL) transmission data should be included. Additionally, the respective portions of the DL transmission data, the guard period, and the UL transmission data should also be configurable, for example, based on the network dynamics of NR. In addition, sidelink resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

In LTE, for a connected UE, the RA procedure may be performed for at least the following events related to the Primary Cell (PCell):
1. Downlink (DL) data arrival during RRC_CONNECTED requiring an RA procedure, e.g., when the Uplink (UL) synchronization status is "non-synchronized."
2. UL data arrival during RRC_CONNECTED requiring an RA procedure, e.g., when the UL synchronization status is "non-synchronized" or no Physical Uplink Control Channel (PUCCH) resources for Scheduling Request (SR) are available.
3. For positioning purpose during RRC_CONNECTED requiring an RA procedure, e.g., when timing advance is needed for UE positioning.

The RA procedure takes two distinct forms: Contention-Based RA (CBRA) and contention-free RA (CFRA). The CBRA procedure may be a four-step procedure in which the RA preamble (msg1) is transmitted on the Random Access Channel (RACH) in UL, the Random Access Response (RAR) (msg2) is generated by the Medium Access Control (MAC) entity and transmitted on the Downlink Shared Channel (DL-SCH), the first scheduled UL data (msg3) is transmitted on the Uplink Shared Channel (UL-SCH), and the contention resolution (msg4) is transmitted in DL. On the other hand, the CFRA procedure may be a three-step procedure in which the RA preamble assignment is transmitted via a dedicated signaling in DL, the RA preamble is transmitted on the RACH in UL, and the RAR is transmitted on DL-SCH.

For the CBRA procedure, the RA preamble is selected by the UE's MAC entity and transmitted to the NW (e.g., a base station) on the pre-configured common RA resources (or common Physical Random Access Channel (PRACH) resources/occasions). After the preamble transmission, the UE's MAC entity may monitor the Physical Downlink Control Channel (PDCCH) in the common search space for RAR(s) identified by the RA-Radio Network Temporary Identifier (RA-RNTI) within a configured RAR window. The RA-RNTI may be calculated by a pre-defined formula associated with the time and frequency of the RA resource on which the RA preamble is transmitted. For example, the RAR window may start at the subframe that contains the end of the last preamble repetition plus three subframes and have the length of a configured RAR window size. The UE's MAC entity may stop monitoring the RAR(s) after successfully receiving an RAR containing the RA preamble identifier(s) that matches the transmitted RA preamble. If no RAR is received in the corresponding the RAR window, or none of the received RARs contains the RA preamble identifier corresponding to the transmitted RA preamble, the RAR reception may be considered not successful and the UE may start transmitting the next RA preamble.

In NR, as in LTE, after transmitting the RA preamble, the UE may monitor the RAR(s) in an RAR window. The RAR window may start with a fixed duration from the end of the RACH transmission occasion and the size of the RAR window is configurable. The RAR reception may be deemed successful if the received RAR corresponds to both the RA preamble transmitted by the UE and the RACH resource in which the UE transmits the RA preamble. Moreover, as in LTE, the RA procedure may be performed on the PCell as well as the Secondary Cell (SCell). Only the CFRA procedure can be performed on the SCell (other than the Primary SCell (PSCell)). The RA procedure for the SCell (other than the PSCell) is only initiated by the NW. When performing the RA procedure on the PCell while Carrier Aggregation (CA) is configured, the UE may transmit the RA preamble to the PCell and receive the corresponding RAR from the PCell. When performing the CFRA procedure on the SCell while CA is configured, the UE may transmit the RA preamble to the SCell and receive the corresponding RAR from the PCell. When performing the RA procedure on the PCell or the PSCell while Dual-Connectivity (DC) is configured, the UE may transmit the RA preamble and receive the RAR on the corresponding cell. When performing the CFRA procedure on the SCell (other than the PSCell) while DC is configured, the UE may transmit the RA preamble on the SCell and receive the corresponding RAR on the PCell in the Master Cell Group (MCG) and the PSCell in the Secondary Cell Group (SCG).

Furthermore, in NR, there may be multiple beams at a higher frequency. For the RA procedure, the UE's MAC entity may need to know the selected Synchronization Signal (SS) block (which may be used to identify a corresponding beam) to select the associated PRACH resource and/or the associated preamble sequences. A selected SS block may be provided by the Layer 1 (L1) to the MAC entity.

For each UE-specific serving cell, one or more DL BWPs and one or more UL BWPs may be configured for a UE through a dedicated Radio Resource Control (RRC) signaling. However, for a UE, there is at most one active DL BWP and at most one active UL BWP at a given time for a serving cell. To switch among different BWPs of a serving cell, in NR, the NW may trigger a BWP switching operation to switch the UE's active BWP from one BWP to another (of the same link direction) via a single scheduling DCI. Furthermore, a timer-based solution may be used to switch the active DL BWP to the default BWP. For example, in NR, once a BWP inactivity timer expires, the UE may switch the active BWP to a default BWP configured by the NW. Moreover, for each serving cell, the maximal number of DL/UL BWP configurations may be:

1. For paired spectrum: 4 DL BWPs and 4 UL BWPs.
2. For unpaired spectrum: 4 DL/UL BWP pairs.
3. For Supplementary uplink (SUL): 4 UL BWPs.

For paired spectrum, a dedicated timer for timer-based active DL BWP switching to the default DL BWP is supported:

1. A UE starts the timer when it switches its active DL BWP to a DL BWP other than the default DL BWP.
2. A UE restarts the timer to the initial value when it successfully decodes a DCI to schedule PDSCH(s) in its active DL BWP.
3. A UE switches its active DL BWP to the default DL BWP when the timer expires.

For unpaired spectrum, a dedicated timer for timer-based active DL/UL BWP pair switching to the default DL/UL BWP pair is supported:

1. A UE starts the timer when it switches its active DL/UL BWP pair to a DL/UL BWP pair other than the default DL/UL BWP pair.
2. A UE restarts the timer to the initial value when it successfully decodes a DCI to schedule PDSCH(s) in its active DL/UL BWP pair.
3. A UE switches its active DL/UL BWP pair to the default DL/UL BWP pair when the timer expires.

The BWP switching operation may be triggered when the RA procedure is on-going. For example, when the UE is performing the RA preamble transmission on the active UL BWP, the BWP switching operation may be triggered by the NW (e.g., the NW transmits a BWP switching indication via an L1 signaling), or a specific timer (e.g., the UE autonomously switches back to the default BWP after the BWP inactivity timer expires). In such a case, the RA procedure and the UE behavior may be affected due to the BWP switching operation. For example, in LTE or NR, the SR procedure is used for requesting UL-SCH resources for a new transmission. If there is a pending SR, the UE may initiate an RA procedure and cancel all pending SR(s) if the MAC entity has no valid PUCCH resource for the configured SR (e.g., Dedicated-SR (D-SR) resources).

In various implementations of the present disclosure, when performing an RA procedure on a BWP, the UE may perform at least one of a plurality of procedures in response to a BWP switching indication received from the NW, based on UE implementation (e.g., decided by the UE itself), pre-configuration, or pre-defined rules. The plurality of procedures may include: (1) continuing with the RA procedure on another BWP, (2) stopping/aborting the RA procedure and initiating a new RA procedure on another BWP, (3) performing an SR procedure on another BWP, (4) ignoring the BWP switching indication and continuing with the RA procedure on the original active BWP, and (5) ignoring the BWP switching indication and continuing with the RA procedure on an initial BWP indicated by the system information from the NW (e.g., a base station). In some implementations, the NW may inform the UE (e.g., via the system information or a dedicated signaling) of whether the BWP switching operation is allowed to be performed during an on-going RA procedure. The UE may use such information to decide which procedure(s) should be performed in response to the BWP switching indication.

For better comprehension, details of the various procedures are described with reference to FIGS. 1 through 10.

FIG. 1 shows a flowchart for a method of handling an RA procedure in a BWP switching operation, in accordance with an implementation of the present disclosure. As shown in FIG. 1, the flowchart includes actions 102, 104 and 106.

In action 102, the UE initiates an RA procedure on a first BWP.

In action 104, the UE receives DCI from the NW (e.g., a base station) via a PDCCH when performing the RA procedure on the first BWP. The DCI includes a BWP switching indication for switching the first BWP to a second BWP.

In action 106, the UE continues with the RA procedure on the second BWP. For example, the UE may continue with the RA procedure on the second BWP by using a group of RA parameters (e.g., the initial RA preamble power (e.g., preambleReceivedTargetPower), the power-ramping factor (e.g., powerRampingStep), and/or the maximum number of RA preamble transmission (e.g., preambleTransMax)) with configured values and a group of UE variables (e.g., the preamble counter (e.g., PREAMBLE_TRANSMISSION_COUNTER) and/or the power ramping counter (e.g., PREAMBLE_POWER_RAMPING_COUNTER)) with successive/non-reset values (e.g., counter values).

In the present implementation, the first BWP may refer to a previous UL/DL active BWP, and the second BWP may refer to a current UL/DL active BWP.

According to FIG. 1, the UE (or the UE's MAC entity) may continue with the on-going RA procedure on the second BWP based on UE implementation, pre-configuration, or pre-defined rules (e.g., the RA procedure is for UL synchronization). It should be noted that for a paired spectrum scenario, the BWP switching indication may mean to switch the DL BWP, but the UL BWP may remain the same or not, and vice versa. For an un-paired spectrum scenario, the BWP switching indication may mean to switch both the DL BWP and UL BWP.

In some implementations, the UE may stop/abort a part of the on-going RA procedure on the first BWP (e.g., the waiting for the corresponding RAR, the transmission of msg3, or the waiting for the corresponding msg4 on the first BWP), and send another new preamble on the RA resources configured on the second BWP. Since the RA procedure is on-going, the number of RA preamble transmissions and/or power ramping steps may be increased. In another implementation, the number of preamble transmissions and/or power ramping steps may not be increased. For example, the RA preamble(s) sent on the RA resources configured on the previous UL BWP may not be counted, and/or the power ramping operation may not be executed.

In some implementations, the UE may continue with the on-going RA procedure if the current active UL BWP and the previous UL BWP are synchronized. For example, the UE may determine whether the current active UL BWP and the previous UL BWP are synchronized based on the pre-configuration (e.g., the current active UL BWP and the previous UL BWP are in the same timing advance group). The NW may indicate which BWP(s) belongs to which timing advance group via an RRC signaling. The NW may transmit all of the corresponding RAR(s) (or msg3) on all or some of the existing DL BWP(s), and the UE may just need to monitor the common search space in the current active DL BWP.

In some implementations, the UE may monitor the common search spaces of both the current active DL BWP and the previous DL BWP for receiving the corresponding RAR (or msg4), in a case that the preamble (or msg3) is transmitted on the previous UL BWP, the UE switches to the current active UL BWP, and the UE still waits for the corresponding RAR (or msg4).

In some implementations, for a UE which transmits the msg3 on UL BWP #1 and switches to UL BWP #2 after transmitting the msg3, the UE may monitor the corresponding msg4 on the current active DL BWP before the contention resolution timer expires.

In some implementations, the NW may transmit the corresponding RAR (or msg4) on the DL BWP associated with the UL BWP which receives the RA preamble (or msg3) from the UE. For example, for a UE which transmits a preamble on UL BWP #1 and switches to UL BWP #2 after transmitting the preamble, the UE may not receive the corresponding RAR from the CORESET of the DL BWP associated with UL BWP #2 within the RAR window. The UE may then try to send another preamble on the RA resources configured for UL BWP #2 for continuing with the RA procedure. For another example, for a UE which transmits the msg3 on UL BWP #1 and switches to UL BWP #2 after transmitting the msg3, the UE may not receive the corresponding msg4 before the contention resolution timer expires. In such a case, the UE may consider the contention resolution is not successful and try to send another RA preamble on the RA resources configured for UL BWP #2 to continue with the RA procedure.

In some implementations, the UE may receive the RAR on DL BWP #1 and switches to UL BWP #2 before transmitting the corresponding msg3. The UL BWP #2 may be different from the DL BWP #1's pairing UL BWP. If the UL grants indicated by the RAR is transmitted on a UL BWP (e.g., the DL BWP #1's pairing UL BWP) other than UL BWP #2, or not valid in UL BWP #2, the UE may switch back to a BWP which has the corresponding UL grants for the msg3 transmission, and wait for the msg4 on the associated DL BWP. The NW may not know that the UE has switched to the BWP on which the UL grants indicated by the RAR are for the msg3 transmission. Therefore, some DL data transmission may be missed by the UE, and the NW may need to send another DCI for BWP switching to control the UE again. For another example, the UE may not transmit the msg3 for contention resolution if the UL grants indicated by the RAR are on a UL BWP (e.g., UL BWP #1) other than UL BWP #2, or not valid in the current active UL BWP (e.g., UL BWP #2). In such a case, the UE may determine that the contention resolution is not successful, and the UE may try to send another RA preamble on the RA resources configured in UL BWP #2 for continuing the RA procedure.

In some implementations, the UE performs action 106 when certain condition(s) is satisfied. For example, the condition may be that the second BWP is configured with RA resource(s) and D-SR resource(s). As another example, the condition may be that the second BWP is configured with RA resource(s) but no D-SR resource(s). In such cases, the UE may, for example, determine whether to enter action 106 by checking whether the second BWP indicated by the DCI is configured with (sufficient) RA resources and/or D-SR resources, depending on UE implementation, pre-configuration or ore-defined rules.

Figure 2:
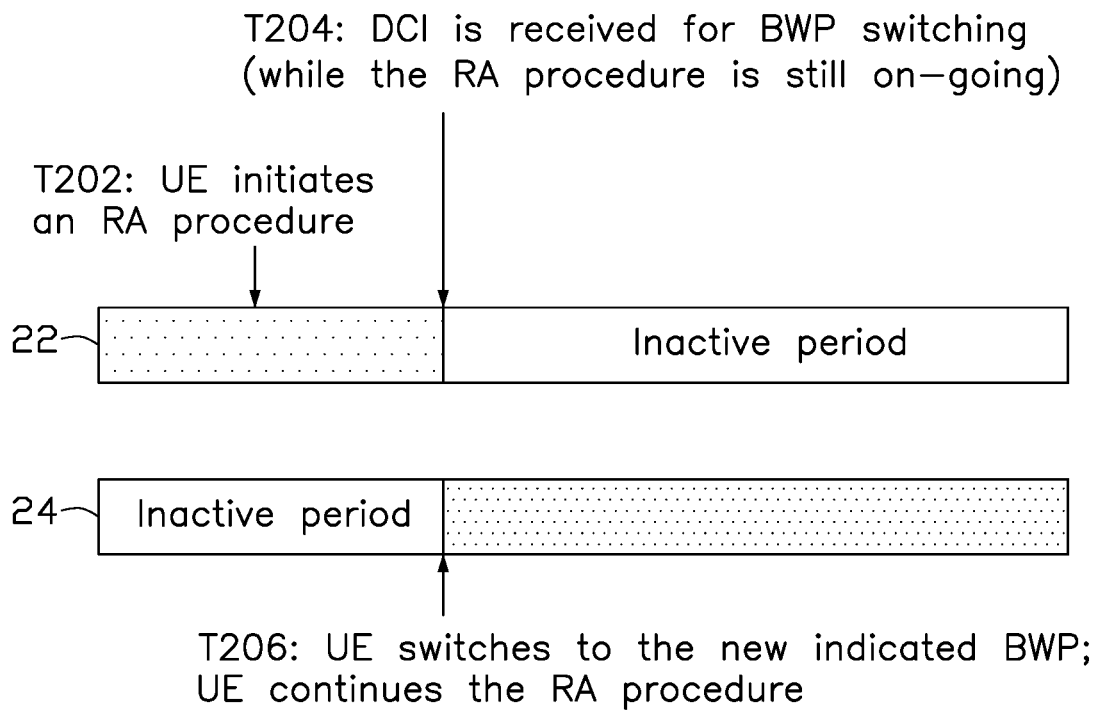
FIG. 2 shows a schematic diagram of the BWP switching operation, in accordance with an implementation of the present disclosure.

FIG. 2 shows a schematic diagram of the BWP switching operation, in accordance with an implementation of the present disclosure. As shown in FIG. 2, the UE first initiates an RA procedure on the BWP 22 at time T202, and then receives DCI from the NW (e.g., a base station) at time T204 while the RA procedure is on-going. The DCI includes, for example, a BWP switching indication for switching UE's active BWP to the BWP 24.

In response to the BWP switching indication, the UE switches from the BWP 22 to the new indicated BWP 24 at time T206, and continues with the RA procedure on the BWP 24. In some implementations, the BWP 24 may be configured with both RA resources and D-SR resources. In some implementations, the BWP 24 may be configured with RA resources but no D-SR resources.

Because in NR the UE may have at most one active DL BWP and at most one active UL BWP at a given time for a serving cell, after the UE switches from the BWP 22 to the BWP 24 at time T206, the BWP 22 enters an inactive period, while the BWP 24 becomes active, as shown in FIG. 2.

Figure 3:
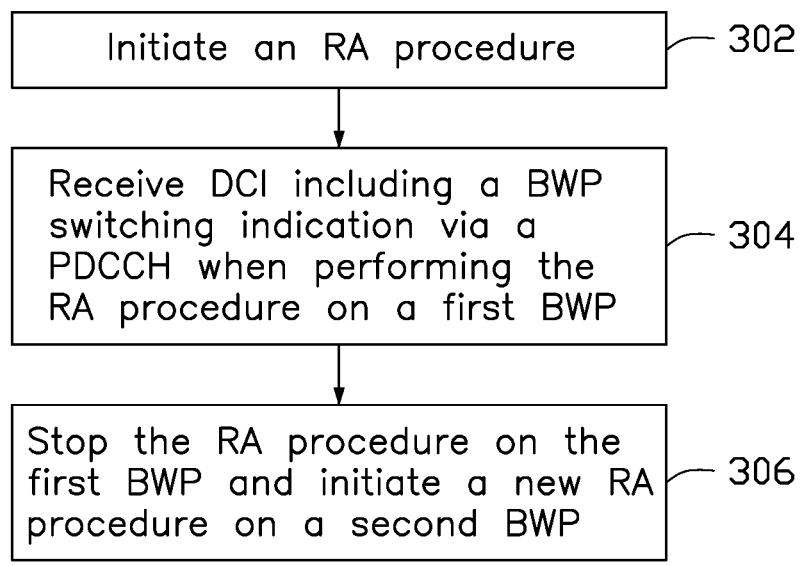
FIG. 3 shows a flowchart for a method of handling an RA procedure in a BWP switching operation, in accordance with an implementation of the present disclosure.

FIG. 3 shows a flowchart for a method of handling an RA procedure in a BWP switching operation, in accordance with an implementation of the present disclosure. As shown in FIG. 3, the flowchart includes actions 302, 304 and 306.

In action 302, the UE initiates an RA procedure on a first BWP.

In action 304, the UE receives DCI from the NW (e.g., a base station) via a PDCCH when performing the RA procedure on the first BWP. The DCI includes a BWP switching indication for switching the first BWP to a second BWP.

In action 306, the UE stops the RA procedure on the first BWP, and initiates a new RA procedure on the second BWP indicated by the DCI. For example, the UE may perform the newly initiated RA procedure on the second BWP by using a group of RA parameters (e.g., the initial RA preamble power (e.g., preambleReceivedTargetPower), the power-ramping factor (e.g., powerRampingStep), and/or the maximum number of RA preamble transmission (e.g., preambleTransMax)) with configured values and a group of UE variables (e.g., the preamble counter (e.g., PREAMBLE_TRANSMISSION_COUNTER) and/or the power ramping counter (e.g., PREAMBLE_POWER_RAMPING_COUNTER)) with reset values.

In the present implementation, the first BWP may refer to a previous UL/DL active BWP, and the second BWP may refer to a current active UL/DL BWP.

According to FIG. 3, the UE (or the UE's MAC entity) may stop/abort the on-going RA procedure on the first BWP and initiate a new RA procedure on the second BWP. For example, the UE may transmit a new preamble on the RA resources configured on the second BWP and start counting the number of preamble transmissions all over again. Such a new preamble may be, for example, the first one preamble for the new RA procedure.

In some implementations, in response to the BWP switching indication, the UE may decide to continue with the on-going RA procedure (e.g., the procedure in FIG. 1), or abort the on-going RA procedure and initiate a new RA procedure on the newly indicated BWP (e.g., the procedure in FIG. 3) based on UE implementation, pre-configuration, or pre-defined rules. For example, the pre-configuration may be provided to the UE via an RRC message (e.g., an RRC reconfiguration message) to indicate to the UE how to respond to the BWP switching indication. The RRC message may or may not include the PRACH configuration for the newly initiated RA procedure on the indicated BWP (e.g., the second BWP). The pre-define rules may be determined based on the numerology for different service types, or based on whether the current active UL BWP and the previous UL BWP are synchronized.

If the RRC message (e.g., the RRC reconfiguration message) that indicates the UE to follow the procedure of FIG. 3 (e.g., initiating a new RA procedure on the indicated BWP) does not include the PRACH configuration for the new RA procedure, the UE, by default, may apply a common PRACH configuration. The common PRACH configuration may be provided by the Remaining Minimum System Information (RMSI). In NR, the minimum system information can be divided into two parts. The first part of the minimum system information is put in the Physical Broadcast Channel (PBCH), and the second part is the RMSI. The first part of the minimum system information may contain at least one of: the System Frame Number (SFN), the scheduling of the RMSI, the "cellBarred" Information Element (IE), and the "intraFreqReselection" IE. The IE "cellBarred" may correspond to the information for quickly identifying the UE that is bared from camping on the cell. The IE "intraFreqReselection" may indicate whether the UE excludes the cells on the same frequency as a candidate for cell selection/reselection for a certain period of time when the cell status in indicated as "barred." On the other hand, the RMSI may include a common RACH configuration and the scheduling information of each system information message that contains a set of system information blocks.

In some implementations, each BWP configuration may include an associated PRACH configuration, and the UE may follow the information (e.g., RA resources) if the RA procedure on that BWP is expected to be proceeded. Moreover, the RRC message (e.g., the RRC reconfiguration message) may further indicate that the new RA procedure is to be executed on the initial BWP or the default BWP. The base station (e.g., gNB) may make such a decision based on, for example, the timing advance group information.

In some implementations, the UE performs action 306 when certain condition(s) is satisfied. For example, the condition may be that the second BWP is configured with RA resource(s) and D-SR resource(s). As another example, the condition may be that the second BWP is configured with RA resource(s) but no D-SR resource(s). In such cases, the UE may determine whether to enter action 306 by checking whether the second BWP indicated by the DCI is configured with (sufficient) RA resources and/or D-SR resources, depending on UE implementation, pre-configuration or ore-defined rules.

Figure 4:
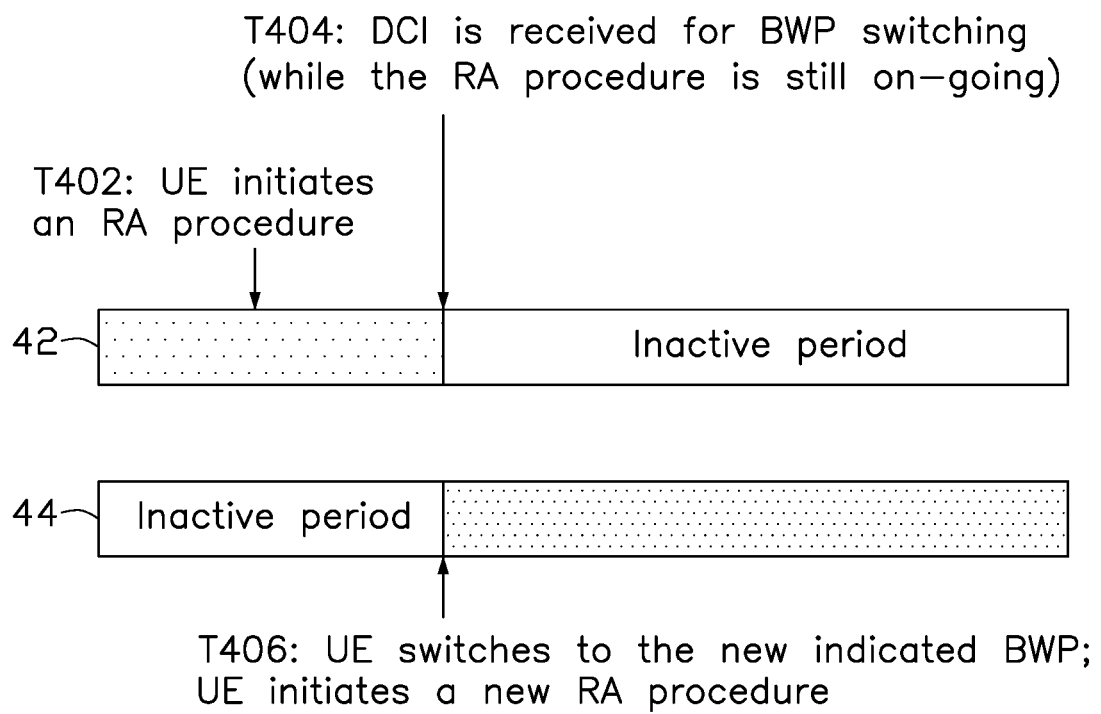
FIG. 4 shows a schematic diagram of the BWP switching operation, in accordance with an implementation of the present disclosure.

FIG. 4 shows a schematic diagram of the BWP switching operation, in accordance with an implementation of the present disclosure. As shown in FIG. 4, the UE first initiates an RA procedure on the BWP 42 at time T402, and then receives DCI for BWP switching from the NW (e.g., a base station) at time T404 while the RA procedure is on-going. After that, the UE switches to the BWP 44 indicated by the DCI at time T406, and initiates a new RA procedure on the indicated BWP 44. In some implementations, the BWP 44 may be configured with both RA resources and D-SR resources. In some implementations, the BWP 44 may be configured with RA resources but no D-SR resources.

Because in NR the UE may have at most one active DL BWP and at most one active UL BWP at a given time for a serving cell, after the UE switches from the BWP 42 to the BWP 44 at time T406, the BWP 42 enters an inactive period, while the BWP 44 becomes active, as shown in FIG. 4.

Figure 5:
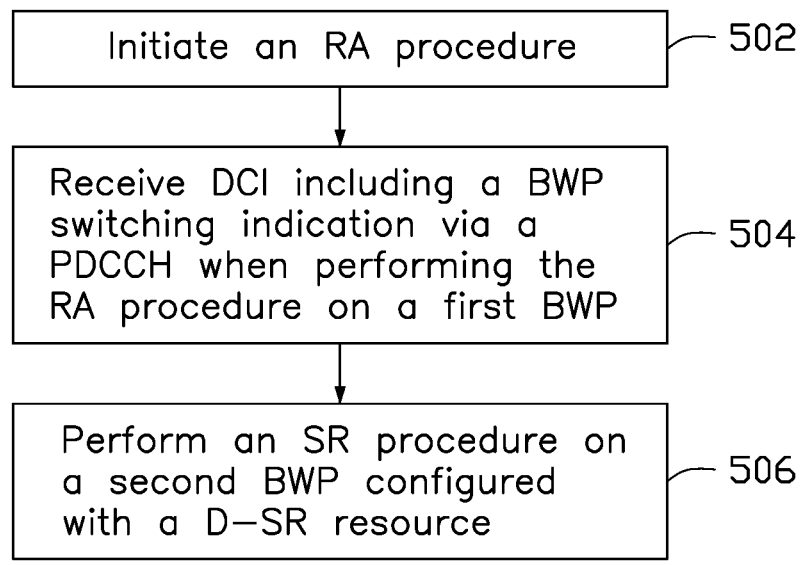
FIG. 5 shows a flowchart for a method of handling an RA procedure in a BWP switching operation, in accordance with an implementation of the present disclosure.

FIG. 5 shows a flowchart for a method of handling an RA procedure in a BWP switching operation, in accordance with an implementation of the present disclosure. As shown in FIG. 5, the flowchart includes actions 502, 504 and 506.

In action 502, the UE initiates an RA procedure on a first BWP.

In action 504, the UE receives DCI from the NW (e.g., a base station) via a PDCCH when performing the RA procedure on the first BWP. The DCI includes a BWP switching indication for switching the first BWP to a second BWP configured with D-SR resource(s).

In action 506, the UE performs an SR procedure on the second BWP.

In the present implementation, the first BWP may refer to a previous UL/DL active BWP, and the second BWP may refer to a current UL/DL active BWP.

According to FIG. 5, the UE (or the UE's MAC entity) may stop/abort the on-going RA procedure based on UE implementation, pre-configuration, or pre-defined rules (e.g., the RA procedure is for UL transmission), and initiate an SR procedure on the second BWP configured with D-SR resources.

In some implementations, the UE performs action 506 when certain condition(s) is satisfied. For example, the condition may be that the second BWP is configured with RA resource(s) and D-SR resource(s). As another example, the condition may be that the second BWP is configured with D-SR resource(s) but no RA resources. In such cases, the UE may determine whether to enter action 506 by checking whether the second BWP indicated by the DCI is configured with (sufficient) RA resources and/or D-SR resources, depending on UE implementation, pre-configuration or ore-defined rules.

Figure 6:
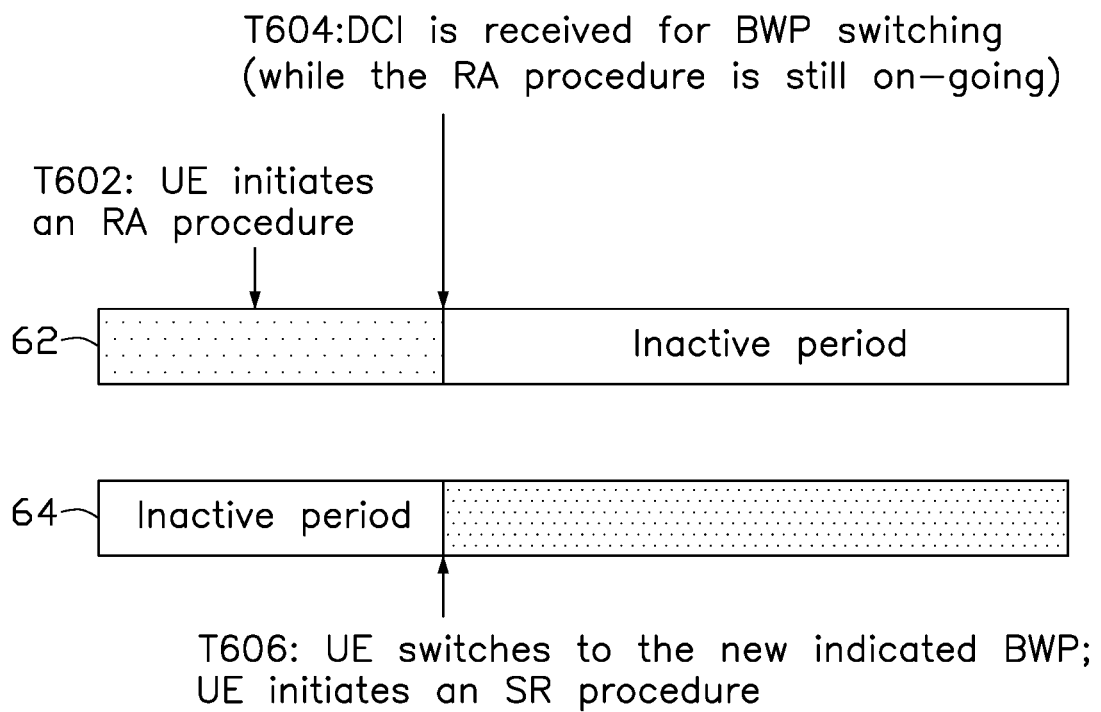
FIG. 6 shows a schematic diagram of the BWP switching operation, in accordance with an implementation of the present disclosure.

FIG. 6 shows a schematic diagram of the BWP switching operation, in accordance with an implementation of the present disclosure. As shown in FIG. 6, the UE first initiates an RA procedure on the BWP 62 at time T602, and then receives DCI for BWP switching from the NW (e.g., a base station) at time T604 while the RA procedure is on-going. The DCI may include a BWP switching indication for switching UE's active BWP to the BWP 64.

In response to the BWP switching indication, the UE switches to the BWP 64 at time T606, and initiates an SR procedure on the BWP 64. In some implementations, the BWP 64 may be configured with both RA resources and D-SR resources. In some implementations, the BWP 44 may be configured with D-SR resources but no RA resources.

Because in NR the UE may have at most one active DL BWP and at most one active UL BWP at a given time for a serving cell, after the UE switches from the previous BWP 62 to the new BWP 64 at time T606, the BWP 62 enters an inactive period, while the BWP 64 become active, as shown in FIG. 6.

Figure 7:
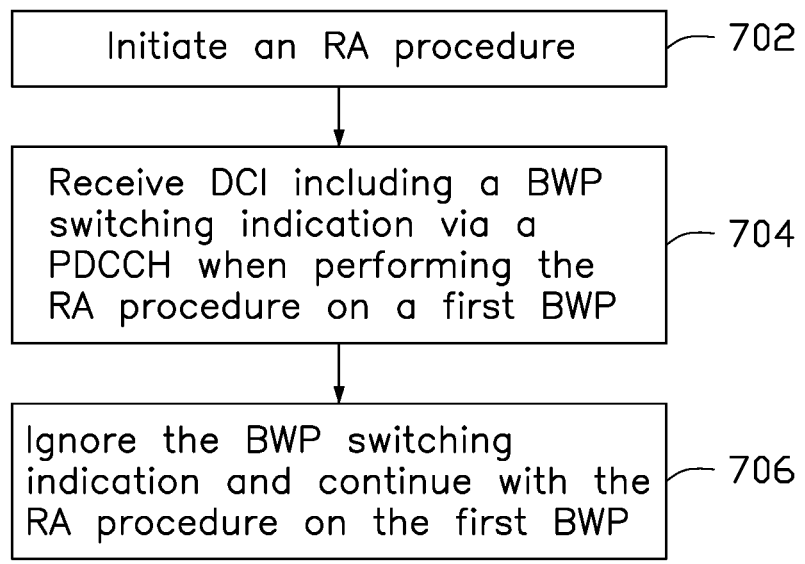
FIG. 7 shows a flowchart for a method of handling an RA procedure in a BWP switching operation, in accordance with an implementation of the present disclosure.

FIG. 7 shows a flowchart for a method of handling an RA procedure in a BWP switching operation, in accordance with an implementation of the present disclosure. As shown in FIG. 7, the flowchart includes actions 702, 704 and 706.

In action 702, the UE initiates an RA procedure on a first BWP.

In action 704, the UE receives DCI from the NW (e.g., a base station) via a PDCCH when performing the RA procedure on the first BWP. The DCI may include a BWP switching indication for switching the first BWP to a second BWP.

In action 706, the UE ignores the BWP switching indication and continues with the on-going RA procedure on the first BWP.

According to FIG. 7, the UE (or the UE's MAC entity) may continue with the RA procedure on the first BWP, based on UE implementation, pre-configuration, or pre-defined rules (e.g., the RA procedure is for UL synchronization).

In some implementations, the UE may ignore the BWP switching indication and stop the BWP inactivity timer. The BWP inactivity timer may be restarted by the UE when the UE decides to execute the BWP switching operation (e.g., switching from the first BWP to a non-default BWP, such as the second BWP). In addition, the UE's MAC entity may inform the Physical Layer (PHY) entity to ignore the DCI while the RA procedure is initiated. The UE's MAC entity may also inform the PHY entity that the RA procedure is successfully completed, so that the PHY entity can execute the DCI again.

In some implementations, if the RA procedure fails (e.g., the value of the preamble counter exceeds a threshold), the UE's MAC entity may indicate an RA problem to the upper layer, and the UE may then switch back to the default BWP. For example, the threshold is the maximum number of RA preamble transmission.

In some implementations, the UE performs action 706 when certain condition(s) is satisfied. For example, the condition may be that the second BWP is configured with RA resource(s) and D-SR resource(s). As another example, the condition may be that the second BWP is configured with RA resource(s) but no D-SR resource(s). As another example, the condition may be that the second BWP is configured with D-SR resource(s) but no RA resource(s). As another example, the condition may be that the second BWP is configured with no D-SR resource(s) and no RA resource(s).

Figure 8:
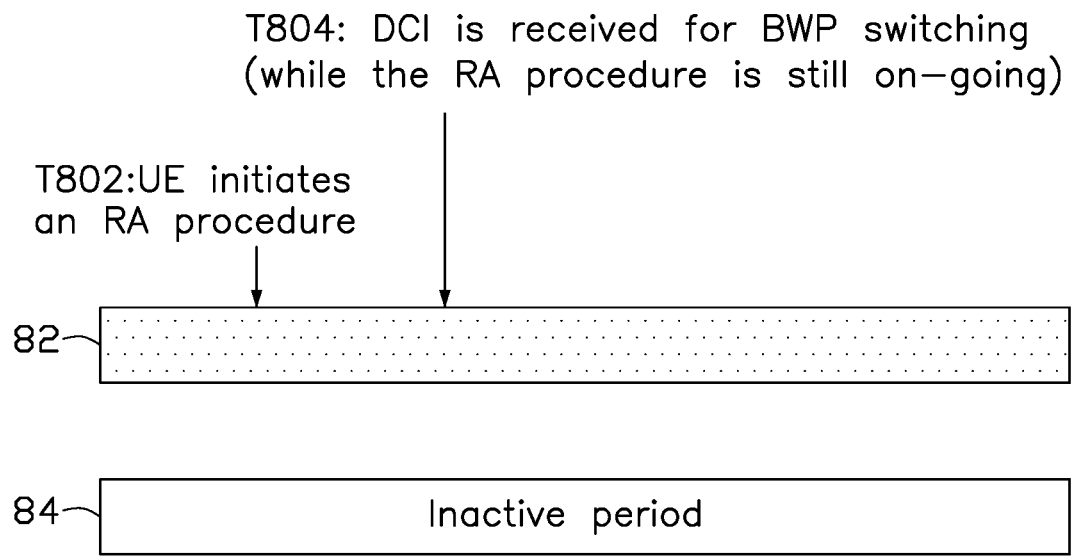
FIG. 8 shows a schematic diagram of the BWP switching operation, in accordance with an implementation of the present disclosure.

FIG. 8 shows a schematic diagram of the BWP switching operation, in accordance with an implementation of the present disclosure. As shown in FIG. 8, the UE first initiates an RA procedure on the BWP 82 at time T802, and then receives DCI from the NW (e.g., a base station) at time T804 while the RA procedure is on-going. The DCI may include, for example, a BWP switching indication for switching the BWP 82 to the BWP 84. In the present implementation, the BWP 84 may be configured with/without RA resources.

In response to the reception of the DCI, the UE may ignore the BWP switching indication, and continue with the RA procedure on the BWP 82.

Figure 9:
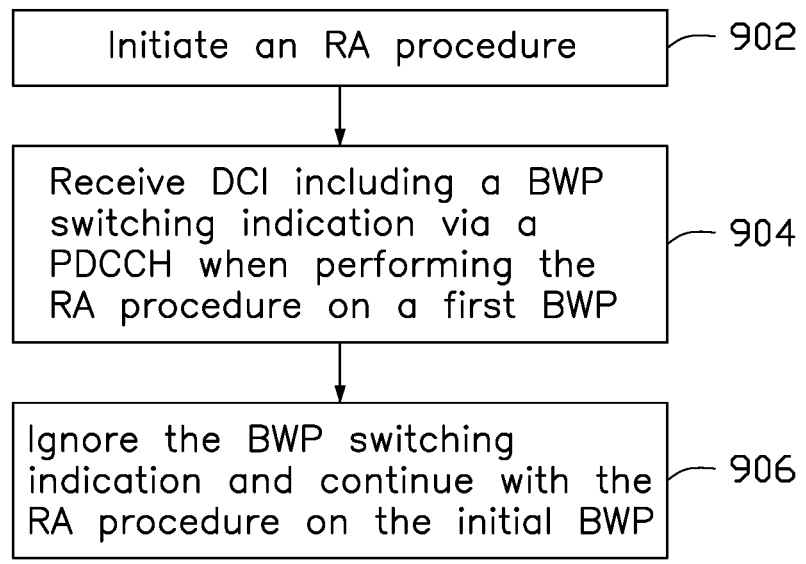
FIG. 9 shows a flowchart for a method of handling an RA procedure in a BWP switching operation, in accordance with an implementation of the present disclosure.

FIG. 9 shows a flowchart for a method of handling RA procedure in BWP switching operation, in accordance with an implementation of the present disclosure. As shown in FIG. 9, the flowchart includes actions 902, 904 and 906. The main difference between the flowchart of FIG. 7 and the flowchart of FIG. 9 is that after ignoring the BWP switching indication in the DCI, the UE (or the UE's MAC entity) may continue with the on-going RA procedure on an initial BWP indicated by the system information from the NW (e.g., a base station), instead of the BWP indicated by the DCI.

As shown in action 902, the UE initiates an RA procedure on a first BWP.

In action 904, the UE receives DCI from the NW (e.g., a base station) via a PDCCH when performing the RA procedure on the first BWP. The DCI includes a BWP switching indication for switching the first BWP to a second BWP.

In action 906, the UE ignores the BWP switching indication and continues with the on-going RA procedure on an initial BWP other than the second BWP. Information of the initial BWP may be transmitted by the NW via the system information.

Figure 10:
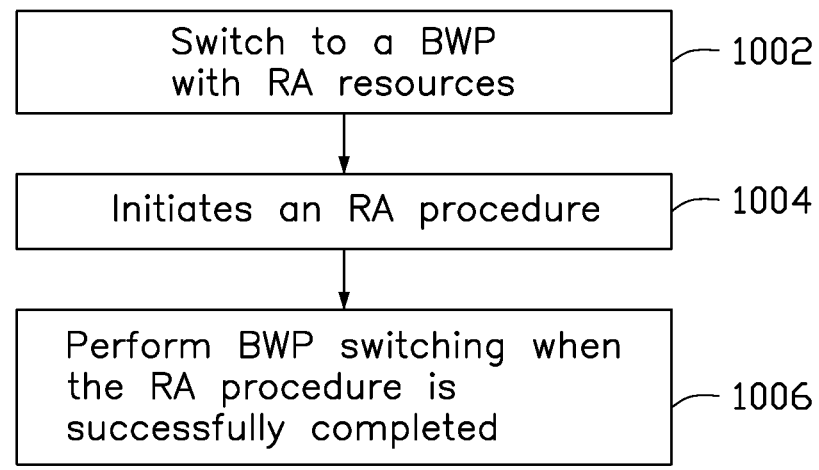
FIG. 10 shows a flowchart for a method of handling an RA procedure in a BWP switching operation, in accordance with an implementation of the present disclosure.

FIG. 10 shows a flowchart for a method of handling an RA procedure in a BWP switching operation, in accordance with an implementation of the present disclosure. As shown in FIG. 10, the flowchart includes actions 1002, 1004 and 1006.

In action 1002, the UE switches to a BWP configured with RA resources.

In action 1004, the UE initiates an RA procedure.

In action 1006, the UE performs the BWP switching operation when the RA procedure is successfully completed.

In some implementations, when the RA procedure is on-going, the UE (or the UE's MAC entity) may autonomously switch back to a pre-configured or pre-defined BWP (e.g., the default BWP or the initial BWP) or any BWP configured with RA resources for performing the RA procedure. In such a case, the UE's MAC entity may inform the PHY entity to switch to the target BWP while the RA procedure is initiated. The UE's MAC entity may further inform the PHY entity that the RA procedure is successfully completed, so that the PHY entity may execute the DCI for BWP switching again. The BWP inactivity timer may be stopped in this case. The UE may restart the BWP inactivity timer when the UE executes the BWP switching operation to a non-default BWP (e.g., the second BWP indicated by the DCI).

In some implementations, if the RA procedure fails (e.g., the value of the preamble counter exceeds a threshold), the UE's MAC entity may indicate an RA problem to the upper layer, and the UE may initiate an RRC connection re-establishment procedure, or switch back to the default BWP. For example, the threshold is the maximum number of RA preamble transmission.

In some implementations, the UE may monitor both the CORESET (or PDCCH) of the active BWP (which the NW indicates to use through the DCI) and the target BWP (on which the UE is performing the RA procedure). The UE may stop the BWP inactivity timer in this case, and restart the BWP inactivity timer when executing the DCI to switch to the non-default BWP.

In some implementations, when the RA procedure is on-going, the UE (or the UE's MAC entity) may continue the on-going RA procedure on the previous active (DL/UL) BWP based on UE implementation, pre-configuration or pre-defined rules (e.g., the RA procedure is for UL synchronization). The UE may ignore the BWP switching indication in the DCI and stop the BWP inactivity timer in this case. The UE may restart the BWP inactivity timer when the UE executes the BWP switching operation in response to the DCI to switch to a non-default BWP. The UE's MAC entity may inform the PHY entity to ignore the DCI while the RA procedure is initiated. The UE's MAC entity may also inform the PHY entity that the RA procedure is successfully completed, so that the PHY entity may execute the DCI command again.

Figure 11:
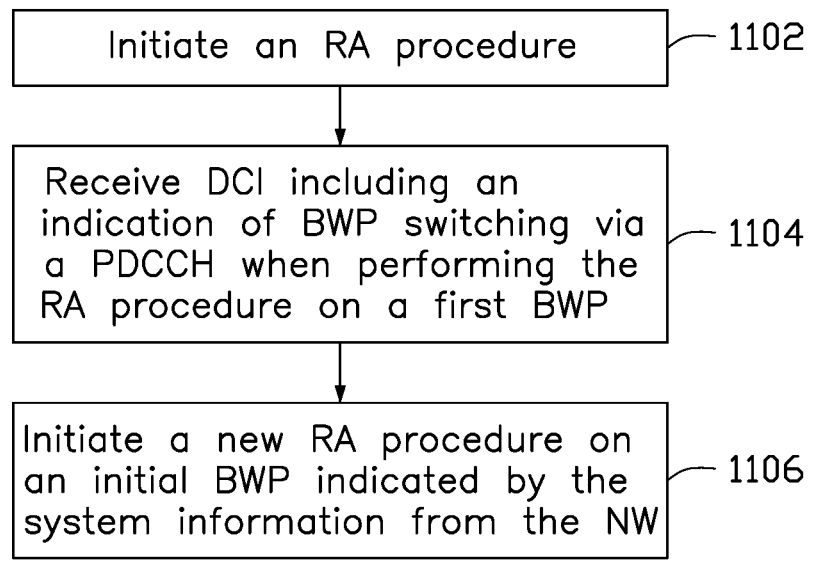
FIG. 11 shows a flowchart for a method of handling an RA procedure in a BWP switching operation, in accordance with an implementation of the present disclosure.

FIG. 11 shows a flowchart of a method for handling RA procedure in BWP switching operation, in accordance with an implementation of the present disclosure. As shown in FIG. 11, the flowchart includes actions 1102, 1104 and 1106.

In action 1102, the UE initiates an RA procedure on a first BWP.

In action 1104, the UE receives DCI from the NW (e.g., a base station) via a PDCCH when performing the RA procedure on the first BWP. The DCI may include a BWP switching indication for switching the first BWP to a second BWP.

In action 1106, the UE initiates a new RA procedure on an initial BWP indicated by the system information from the NW (e.g., a base station) because the second BWP is not configured with (valid) RA resources.

In the present implementation, the UE may switch to the second BWP in response to the received DCI. After that, if the UE finds that the second BWP does not have RA resources for performing the RA procedure, the UE may then switch back to the initial BWP which is configured with RA resource(s), and initiate a new RA procedure on the initial BWP.

Figure 12:
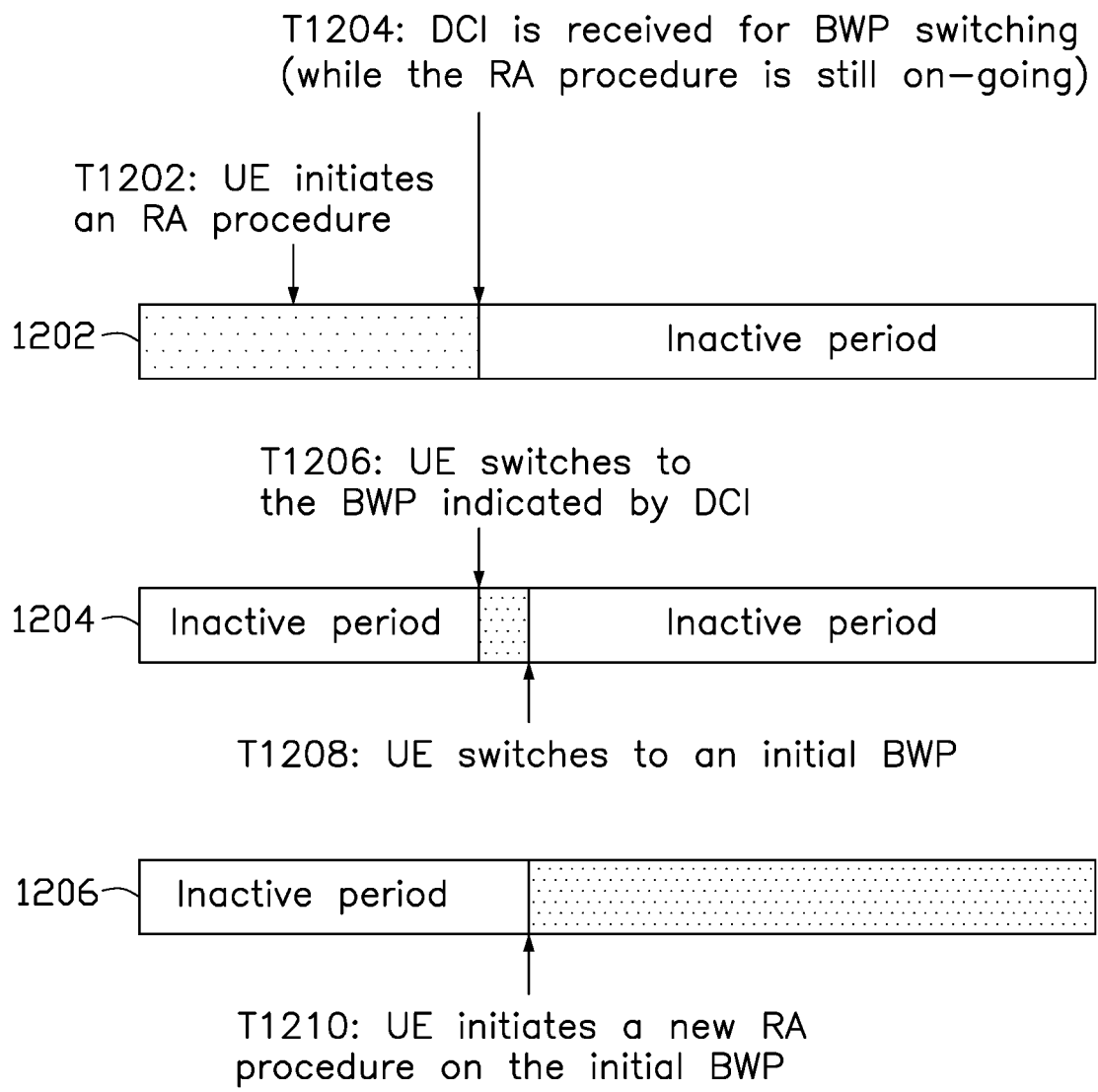
FIG. 12 shows a schematic diagram of the BWP switching operation, in accordance with an implementation of the present disclosure.

FIG. 12 shows a schematic diagram of the BWP switching operation, in accordance with an implementation of the present disclosure. As shown in FIG. 12, the UE first initiates an RA procedure on the BWP 1202 at time T1202, and then receives DCI from the NW (e.g., a base station) at time T1204 while the RA procedure is on-going. The DCI may include, for example, a BWP switching indication for switching the BWP 1202 to the BWP 1204.

At time T1206, the UE switches to the BWP 1204 according to the DCI but finds that the BWP 1204 is not configured with (valid) RA resources. Then, at time T1208, the UE autonomously switch back to an initial BWP indicated 1206 by the system information from the NW (e.g., a base station). At time T1210, the UE initiates a new RA resource on the BWP 1206 (initial BWP).

Figure 13:
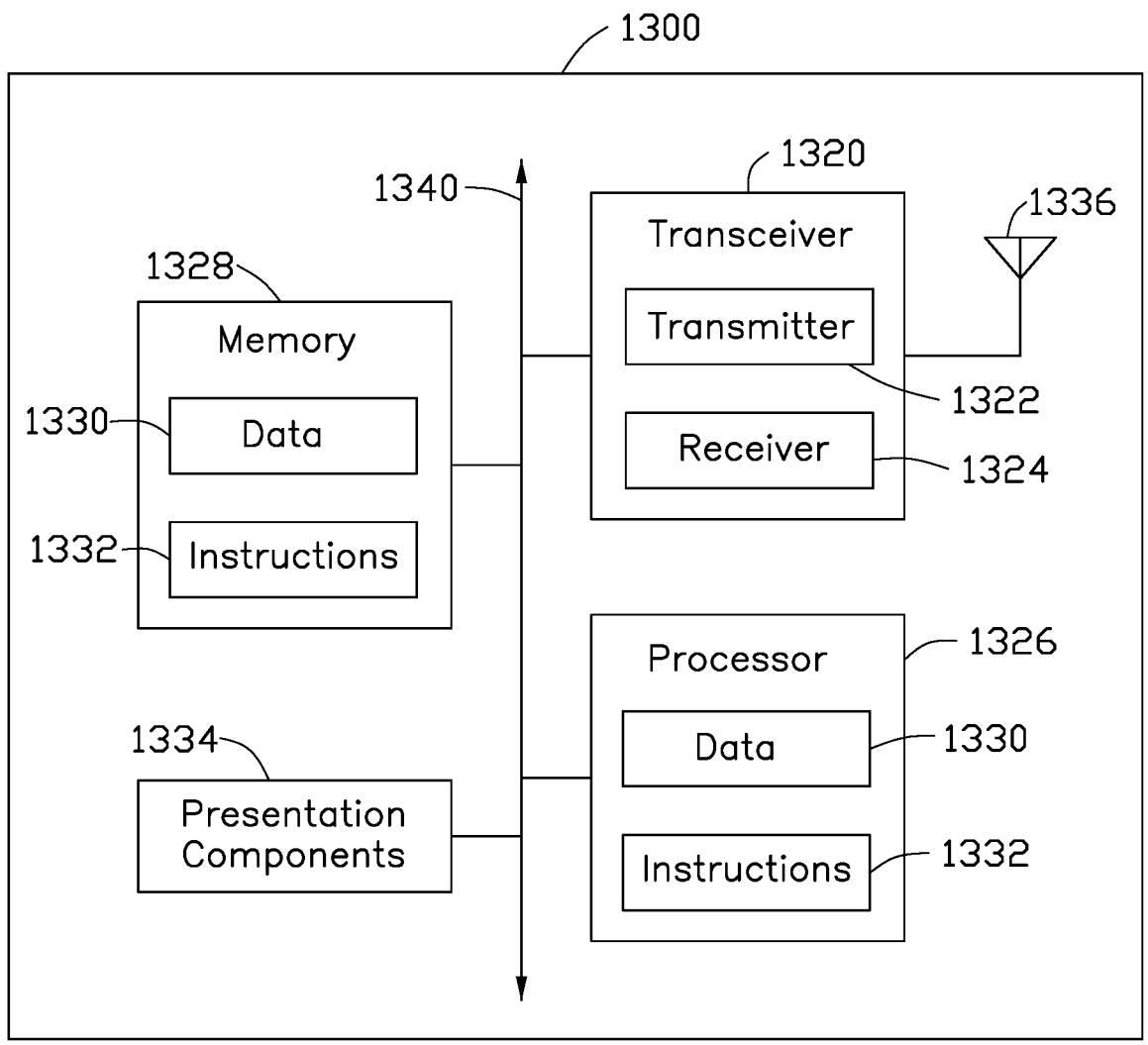
FIG. 13 illustrates a block diagram of a node for wireless communication, in accordance with various aspects of the present application.

FIG. 13 illustrates a block diagram of a node for wireless communication, in accordance with various aspects of the present application. As shown in FIG. 13, a node 1300 may include a transceiver 1320, a processor 1326, a memory 1328, one or more presentation components 1334, and at least one antenna 1336. The node 1300 may also include an RF spectrum band module, a base station communications module, a network communications module, and a system communications management module, input/output (I/O) ports, I/O components, and power supply (not explicitly shown in FIG. 13). Each of these components may be in communication with each other, directly or indirectly, over one or more buses 1340. In one implementation, the node 1300 may be a UE or a base station that performs various functions described herein, for example, with reference to FIGS. 1 through 12.

The transceiver 1320 having a transmitter 1322 (e.g., transmitting/transmission circuitry) and a receiver 1324 (e.g., receiving/reception circuitry) may be configured to transmit and/or receive time and/or frequency resource partitioning information. In some implementations, the transceiver 1320 may be configured to transmit in different types of subframes and slots including, but not limited to, usable, non-usable and flexibly usable subframes and slot formats. The transceiver 1320 may be configured to receive data and control channels.

The node 1300 may include a variety of computer-readable media. Computer-readable media can be any available media that can be accessed by the node 1300 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1328 may include computer-storage media in the form of volatile and/or non-volatile memory. The memory 1328 may be removable, non-removable, or a combination thereof. Exemplary memory includes solid-state memory, hard drives, optical-disc drives, and etc. As illustrated in FIG. 13, The memory 1328 may store computer-readable, computer-executable instructions 1332 (e.g., software codes) that are configured to, when executed, cause the processor 1326 to perform various functions described herein, for example, with reference to FIGS. 1 through 12. Alternatively, the instructions 1332 may not be directly executable by the processor 1326 but be configured to cause the node 1300 (e.g., when compiled and executed) to perform various functions described herein.

The processor 1326 (e.g., having processing circuitry) may include an intelligent hardware device, e.g., a central processing unit (CPU), a microcontroller, an ASIC, and etc. The processor 1326 may include memory. The processor 1326 may process the data 1330 and the instructions 1332 received from the memory 1328, and information through the transceiver 1320, the base band communications module, and/or the network communications module. The processor 1326 may also process information to be sent to the transceiver 1320 for transmission through the antenna 1336, to the network communications module for transmission to a core network.

One or more presentation components 1334 presents data indications to a person or other device. Exemplary presentation components 1334 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A User Equipment (UE), comprising:
one or more non-transitory computer-readable media having computer-executable instructions embodied thereon; and
at least one processor coupled to the one or more non-transitory computer-readable media, and configured to execute the computer-executable instructions to:
receive a configuration of a first Bandwidth Part (BWP) through Radio Resource Control (RRC) signaling from a Base Station (BS);
initiate a Random Access (RA) procedure on the first BWP;
receive Downlink Control Information (DCI) indicating a BWP switching from the first BWP to a second BWP;
determine whether to switch to the second BWP in response to receiving the DCI;
in a case that the UE determines to switch to the second BWP:
stop the RA procedure that is ongoing on the first BWP;
determine whether the second BWP is configured with an RA resource; and initiate, after determining that the second BWP is not configured with the RA resource, a new RA procedure on an initial BWP, the UE being informed of the initial BWP via system information received from the BS; and in a case that the UE determines not to switch to the second BWP:
continue with the RA procedure that is ongoing on the first BWP; and
stop a BWP inactivity timer.

2. The UE of claim 1, wherein the at least one processor is further configured to execute the computer-executable instructions to:
perform the new RA procedure on the initial BWP by using a group of RA parameters with configured values and using a group of UE variables with reset values.

3. The UE of claim 2, wherein the group of UE variables comprises at least one of a preamble counter and a power ramping counter.

4. The UE of claim 1, wherein the at least one processor is further configured to execute the computer-executable instructions to:
initiate the new RA procedure on the second BWP after determining that the second BWP is configured with the RA resource.

5. A method performed by a User Equipment (UE), the method comprising:
receiving a configuration of a first Bandwidth Part (BWP) through Radio Resource Control (RRC) signaling from a Base Station (BS);
initiating a Random Access (RA) procedure on the first BWP;
receiving Downlink Control Information (DCI) indicating a BWP switching from the first BWP to a second BWP;
determining whether to switch to the second BWP in response to receiving the DCI;
in a case that the UE determines to switch to the second BWP:
stopping the RA procedure that is ongoing on the first BWP;
determining whether the second BWP is configured with an RA resource; and
initiating, after determining that the second BWP is not configured with the RA resource, a new RA procedure on an initial BWP, the UE being informed of the initial BWP via system information received from the BS; and
in a case that the UE determines not to switch to the second BWP:
continuing with the RA procedure that is ongoing on the first BWP; and
stopping a BWP inactivity timer.

6. The method of claim 5, further comprising:
performing the new RA procedure on the initial BWP by using a group of RA parameters with configured values and using a group of UE variables with reset values.

7. The method of claim 6, wherein the group of UE variables comprises at least one of a preamble counter and a power ramping counter.

8. The method of claim 5, further comprising:
initiating the new RA procedure on the second BWP after determining that the second BWP is configured with the RA resource.

* * * * *